US009843841B2

(12) United States Patent
Smith et al.

(10) Patent No.: US 9,843,841 B2
(45) Date of Patent: Dec. 12, 2017

(54) HIGH DENSITY INTERACTIVE MEDIA GUIDE

(71) Applicant: THOMSON LICENSING, Issy de Moulineaux (FR)

(72) Inventors: Gregory Clark Smith, Austin, TX (US); James J. Leftwich, Palo Alto, CA (US)

(73) Assignee: THOMSON Licensing, Issy-les-Moulineaux ( * ) Notice: Subject to any disclaimer, the term of this patent is extended or adjusted under 35 U.S.C. 154(b) by 0 days.

(21) Appl. No.: 14/156,604

(22) Filed: Jan. 16, 2014

(65) Prior Publication Data

US 2014/0143812 A1 May 22, 2014

Related U.S. Application Data

(63) Continuation of application No. 11/918,194, filed as application No. PCT/US2005/045438 on Dec. 16, 2005, now abandoned.

(60) Provisional application No. 60/672,304, filed on Apr. 18, 2005.

(51) Int. Cl.
*G06F 3/00* (2006.01)
*G06F 13/00* (2006.01)
*H04N 5/445* (2011.01)
*H04N 21/482* (2011.01)
*H04N 21/488* (2011.01)
*H04N 21/431* (2011.01)
(Continued)

(52) U.S. Cl.
CPC ..... *H04N 21/4821* (2013.01); *H04N 5/44543* (2013.01); *H04N 21/4314* (2013.01); *H04N 21/482* (2013.01); *H04N 21/488* (2013.01); *H04N 21/84* (2013.01); *H04N 21/8456* (2013.01)

(58) Field of Classification Search
CPC ........... H04N 21/4314; H04N 21/4821; H04N 21/44543; H04N 21/482; H04N 21/488; H04N 21/84; H04N 21/8456
See application file for complete search history.

(56) References Cited

U.S. PATENT DOCUMENTS 5,999,177 A * 12/1999 Martinez ................. 715/784
6,392,709 B1   5/2002 Orito
6,505,194 B1 * 1/2003 Nikolovska et al. ......... 707/768
(Continued)

FOREIGN PATENT DOCUMENTS

EP    1126701    8/2001
JP   11098428    4/1999
(Continued)

*Primary Examiner* — Joshua Taylor
(74) *Attorney, Agent, or Firm* — Brian J. Dorini, Esq.; Michael A. Pugel, Esq.

(57) ABSTRACT

A high density interactive media guide interface (100) provides for the selection of a source from a dense array of available sources (105, 110) by displaying an array of available sources (105, 110) in a dense format that illustrates the availability of a high number of sources and expanding the display of selected sources (120, 130) to provide additional information regarding that source. "Clickless selection" is provided by either positioning the cursor over the desired selection or positioning the desired selection under a pre-designated position.

63 Claims, 7 Drawing Sheets

(51) Int. Cl.
*H04N 21/84* (2011.01)
*H04N 21/845* (2011.01)

(56) References Cited

U.S. PATENT DOCUMENTS

| | | | |
|---|---|---|---|
| 6,532,590 B1* | 3/2003 | Chimoto | 725/43 |
| 6,577,350 B1* | 6/2003 | Proehl et al. | 348/564 |
| 6,857,128 B1* | 2/2005 | Borden et al. | 725/39 |
| 2002/0083449 A1 | 6/2002 | Im | |
| 2003/0011636 A1 | 1/2003 | Feroglia et al. | |
| 2003/0023989 A1 | 1/2003 | Chevallier et al. | |
| 2003/0043149 A1* | 3/2003 | Safadi et al. | 345/428 |
| 2003/0086694 A1* | 5/2003 | Davidsson | 386/83 |
| 2004/0008228 A1 | 1/2004 | Smith | |
| 2004/0237105 A1 | 11/2004 | Ha | |

FOREIGN PATENT DOCUMENTS

| | | |
|---|---|---|
| JP | 2001194469 | 7/2000 |
| JP | 2001134358 | 5/2001 |
| JP | 2004297589 | 10/2004 |
| JP | 2000287179 | 10/2013 |
| KR | 1020040090185 | 10/2004 |

\* cited by examiner

FIG. 5

HIGH DENSITY INTERACTIVE MEDIA GUIDE

This application is a continuation of applicant's co-pending U.S. application Ser. No. 11/918,194, filed Mar. 5, 2009 which claims the benefit under U.S.C. §365 of International Application PCT/US2005/045438, filed on Dec. 16, 2005 which claims the benefit under 35 U.S.C. §119 of provisional application 60/672,304 filed in the United States on Apr. 18, 2005.

FIELD OF THE INVENTION

The present invention relates to a high density media guide interface for efficiently selecting a channel or a source and media content from a large number of available possibilities and obtaining additional information about that channel or source. More specifically, the present invention provides a new graphic user interface capable of selecting an entry from a high number of possibilities and dynamically expanding the viewing area associated with that entry and providing additional information about selected entries.

BACKGROUND OF THE INVENTION

Home entertainment systems, including television and media centers, are converging with the Internet and providing a large number of available sources. This expansion in the number of available sources necessitates a new strategy for navigating the media interface and making selections.

The large number of possible sources creates an interface challenge that has not yet been successfully solved in the field of home media entertainment. This challenge involves successfully presenting users with a large number of items (programs, sources, items, etc.) without the need to tediously navigate through multiple display pages.

The information bottleneck in present media guide interfaces is largely the result of the limits to user awareness. If users cannot see all of the possible choices at one time, or are forced to spend inordinate amounts of time and effort in order to gain awareness of same, then it is likely that opportunities will be missed. Mere novel interaction methodologies, such as moving in three dimensions through virtual space, or using physical gestures to control and adjust settings or processes in displays or devices, while useful, do not address this problem of the "awareness bottleneck."

SUMMARY OF THE INVENTION

The preferred embodiments of the present invention comprise a graphical user display interface for organizing and presenting highly dense information and associated functionality, choices, and a wide range of interactive options. Information is represented in an organized array of minimized elements. These minimal elements are associated with available programming content and are visually differentiated via position, color, size, length, location, grouping, behavior, or by juxtaposing icons or signifying symbols. A user selects an element of interest by merely moving a cursor to the element. Selected elements are expanded and additional information about the selected element is automatically provided without further action on the behalf of the user. Elements nearby the selected element are partially expanded and additional information is also displayed for them. The enlarged viewing areas for the selected and nearby elements allow the user to easily read the information associated with these elements. Information associated with the expanded elements includes text, labels, advertisements, media, graphics, animation, and additional information.

BRIEF DESCRIPTION OF THE DRAWINGS

FIG. 5 illustrates the Channel Guide Overview interface.

DETAILED DESCRIPTION

Figure 1:
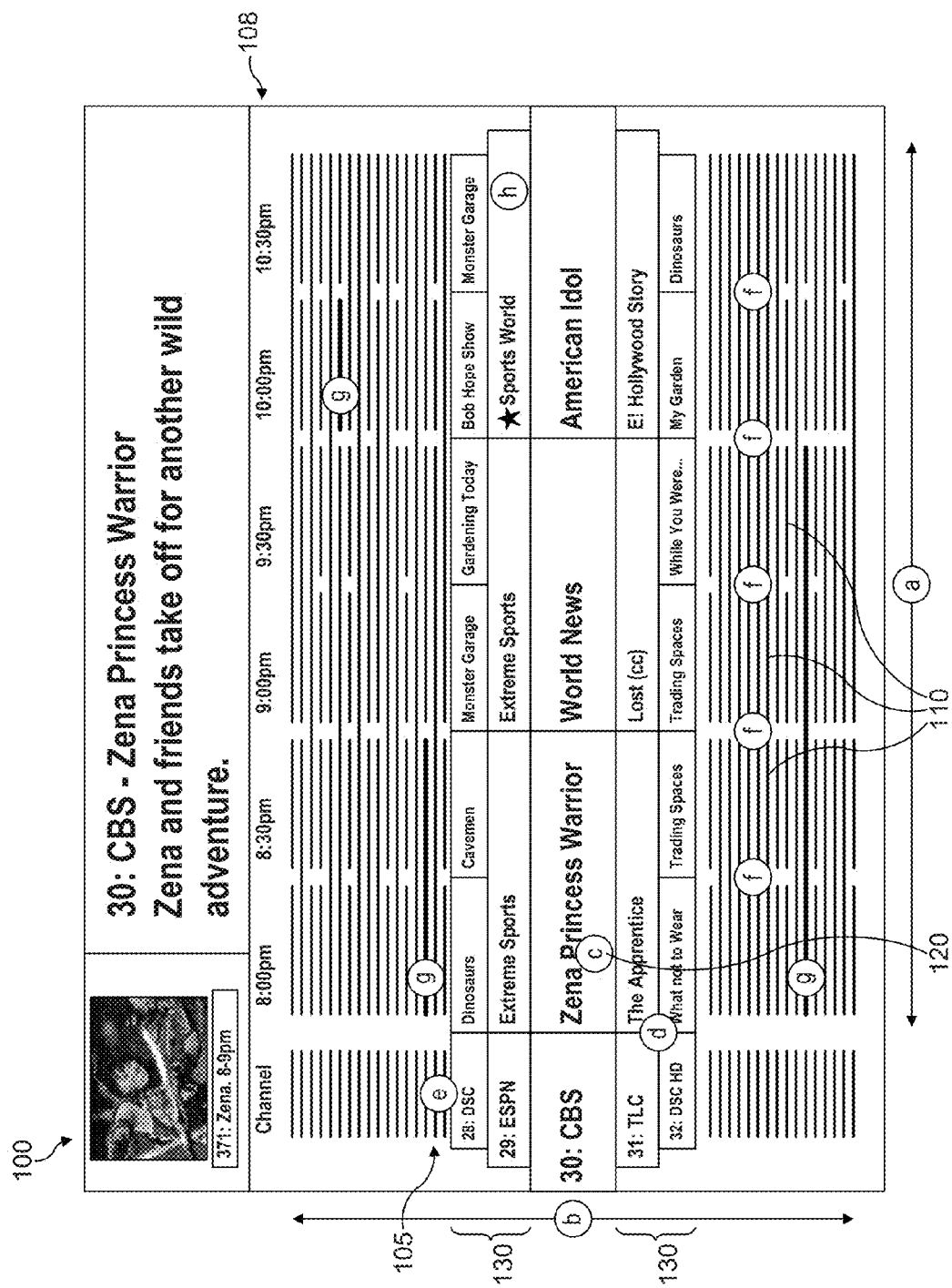
FIG. 1 illustrates the Interactive Overview interface.

The following is a detailed description of the preferred embodiments of the present invention. However, the present invention is in no way intended to be limited to the embodiments discussed below or shown in the drawings. Rather, the description and the drawings are merely illustrative of the presently preferred embodiments of the invention.

FIG. 1 illustrates an Interactive Overview interface 100. Interface 100 allows a greater density of information than is possible in traditional programming guide screens. Instead of traditional pages containing five to ten lines of programs, display 100 presents hundreds, and potentially thousands of individual elements 110, each potentially having unique visual, spatial, and behavioral attributes representing available programming, channels, executables, music files, or combinations thereof.

Available channels are displayed in a vertical column 105. Available time slots are indicated by header information provided in header 108. Programming content for the channels and time slots are displayed as individual elements 110 in a two-dimensional display. As illustrated, channel information in column 105 and individual elements 110 are displayed as simply a line or row of dots. This corresponds to the resolution limit of a typical monitor or television display. The individual entries in column 105 act as visual tags or placeholders representing channels or sources while individual elements 110 represent specific content corresponding to the associated channel and time slot.

Elements 110 are of minimal size so that a maximum number of elements 110 may populate interface 100. In the preferred embodiment, displayed elements 110 do not contain additional information because this would either exceed the display limitations of typical monitors and televisions or reduce the number of elements 110 that could be displayed on one screen. Accordingly, simply magnifying the individual elements does not provide additional information. In general, all elements 110 are similar in appearance. However, elements 110 are visually differentiated through color, size, length, location, grouping, or behavior, or by juxtaposing associated icons or signifying symbols in order to help a user identify a particular channel or content of interest. This differentiation may be done by the content provider or by the user.

A user selects one of elements 110 by using a pointing device such as a mouse, or, in the preferred embodiment, a hand-held inertial pointing device such as the Gyration cordless optical mouse. Once one of elements 110 is selected, it is expanded onto an enlarged viewing area, as illustrated by selected element 120. More specifically, the display area associated with selected element 120 is enlarged and additional content associated with selected element 120 is displayed to provide the user with more information about the selected source. Elements 110 proximate to selected element 120 are partially expanded as illustrated by proximate elements 130, such that proximate elements 130 closest to selected element 120 are largest in size, but smaller than element 120. Additional content associated with proximate elements 130 is displayed in a smaller format that selected element 120, and less information, or information in a smaller format, is provided as compared with selected element 120. Content associated with element 120 and elements 130 may include text, labels, advertisements, media, graphics, animation, and additional information. The progressive expansion of viewing areas and available content about elements proximate to selected element 120 is referred to by the inventors as "hyperbolic expansion." In the preferred embodiment, progressive expansion is vertically and horizontally, but in other embodiments may be only horizontal or vertical.

Elements 110 may be selected in different ways. In a first selection methodology, elements 110 are selected by moving a cursor up and down, which selects the elements on a particular horizontal line. In this methodology, as illustrated in FIG. 1, a number of elements on a horizontal line are displayed in expanded viewing areas. In an alternative display mode, individual elements 110 may be selected by moving the cursor in both horizontal (x) and vertical (y) dimensions and the selected elements and the proximate elements may be viewed in an viewing area which is expanded in both horizontal and vertical dimensions. Both of these types of displays provide for progressive, i.e. hyperbolic, expansion.

In a second selection methodology, the area in which the elements are expanded remains in a fixed position, such as the middle of interface 100 as illustrated in FIG. 1. Movement of the pointing device moves the display of channels in column 105 and the display of elements 110 "under" the expansion area. This can be done either in a vertical-only mode, which selects one horizontal row at a time as illustrated in FIG. 1, or in a mode that selects individual elements in response to both x and y motions of the input device. In both selection methodologies, proximate elements 130 near selected element 120 are progressively (i.e. hyperbolically) expanded. Content associated with selected element 120 and proximate elements 130 are invoked in correspondingly increased degrees.

Additional elements 110 are made available on interface 100 by scrolling. Specifically, the entire display can be scrolled vertically to show additional channels and the associated content. Similarly, the display can be scrolled horizontally to show the content associated with other time slots. In the case of horizontal scrolling, channel column 105 remains fixed and the time slot header 108 and displayed elements 110 scroll horizontally.

The preferred embodiment is designed to be compatible with a hand-held pointing device such as gyroscopic Gyration cordless optical mouse. A traditional mouse or even a traditional 4-way control with up-down-left-right buttons could be substituted. However, the hand-held pointing technology is preferable in that it provides: (1) direct, smooth, and natural control and, and (2) activation of functions, and modalities via direct gestural signaling (i.e. a unique directional gesture or motion to invoke and launch different functions, such as 'page forward,' 'cancel,' etc., and modes, home music, network browsing, etc.). This type of direct interaction allows for a faster, more direct, and fluid motion across interface 100.

Figure 2:
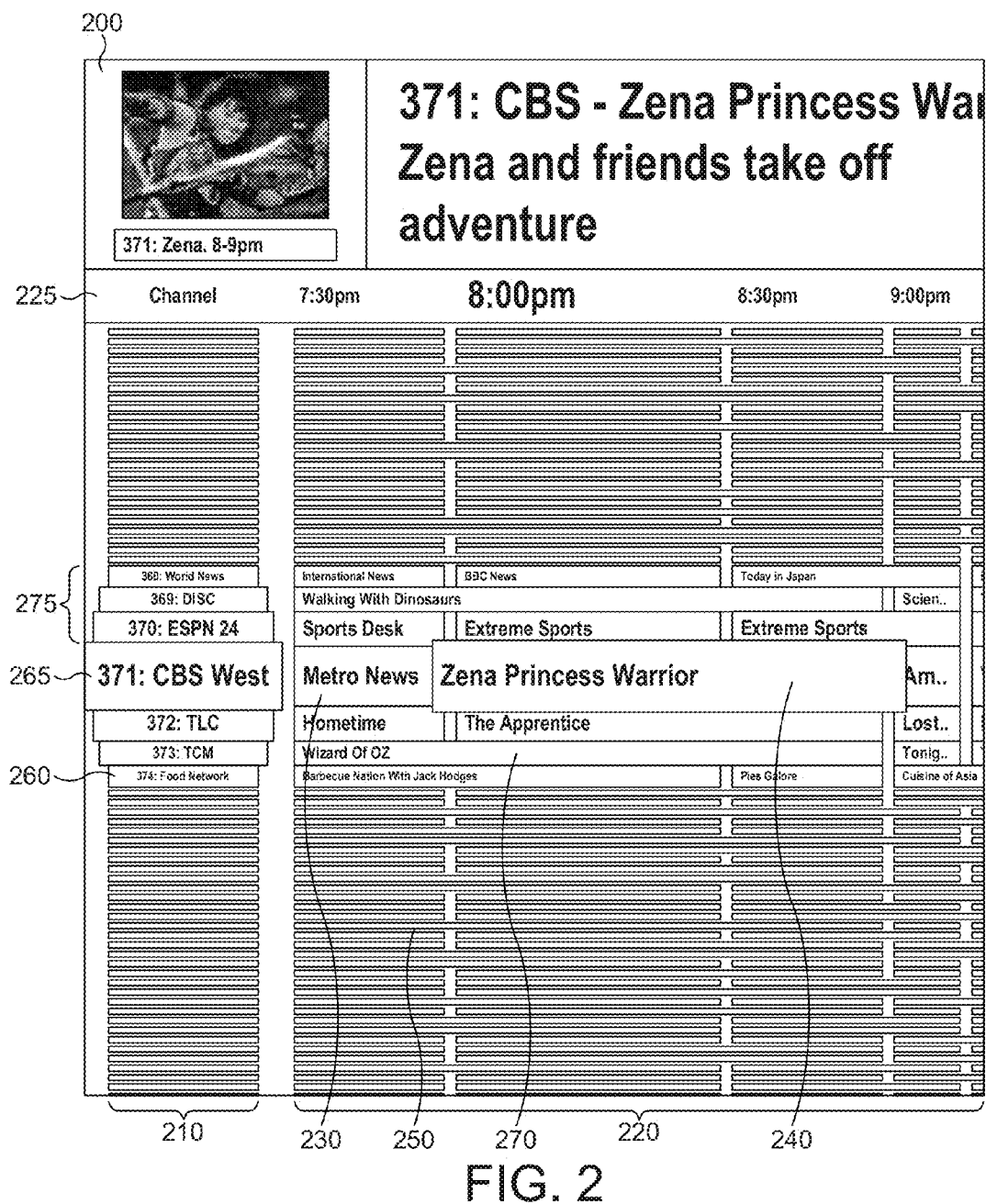
FIG. 2 illustrates the Grid Guide interface.

FIG. 2 illustrates a Grid Guide interface 200. Interface 200 presents programs and media (or other available and/or scheduled data objects or opportunities) in much the same format as interface 100. One difference is that interface 200 uses a more distinct cell-based X/Y grid configuration. Referring to FIG. 2, Y-axis channel column 210 lists channels/sources 260. Other Y-axis columns 220 represent programming available during chronologically-ordered time slots (e.g. 8:00, 8:30, 9:00, etc., representing half-hour increments of television programming). The time slots are identified in header 225. Programs 230 corresponding to various channels/sources 260 and time slots displayed in header 225 are presented in a two dimensional array such that programs 230 corresponding to a particular channel are presented on the same horizontal row and programs 230 corresponding to a particular time slot are presented in the same vertical column.

In order to display additional content, the array of programs 230 may be scrolled vertically and horizontally. Channel column 210 scrolls vertically as the array of programs 230 scrolls vertically, but does not scroll horizontally when the array of programs 230 scrolls horizontally.

A user can select a particular cell 240, which causes it to expand without any further action on behalf of the user. Additional information associated with selected cell 240 is then provided. A clicking or other user action, such as a gesture, provides further information about the selected cell, including a menu of possible related information, websites, addresses, etc. Cells 270 proximate to selected cell 240 are progressively (hyperbolically) expanded horizontally and vertically in relation to their proximity to selected cell 240 with the cells closest to selected cell 240 being expanded the greatest amount. Channel cell 265 corresponding to selected cell 240, and channel cells 275 proximate to channel cell 265 are progressively expanded. Information associated with expanded cells may include text and labels. Additional information such as advertisements, media, graphics, animation, and other information may be automatically or selectively invoked when a cell is selected.

As in interface 100, Grid Guide interface 200 has two alternative methodologies for selection. First, cells can be selected by simply dragging the cursor over the cell. The cursor may be visual or it may be implied or virtual. That is, the position of the virtual cursor may only be evidenced by a visual change in the selected item. In a second methodology, the user may drag the array of cells 230 "under" an expansion area. In the preferred embodiment this expansion area is located in the middle of display 200. (This can be visualized by imagining the spreadsheet-style grid itself being physically dragged around beneath a fixed-position magnifying glass). Thee is also an expansion area for the corresponding channels in column 210.

Scrolling of program cells 230 may be effected in either a vertical or a horizontal direction to display additional program cells. The scrolling may also be constrained. In the preferred embodiment, the scrolling may be constrained to a single axis by pressing an option key on the hand-held controller. Alternatively, the interface may detect the initial detected directional motion (e.g. up and down through channels in a single time slot, or left and right along a single channel through multiple time slots) and constrain the scrolling to that axis. In this method, scrolling continues in the direction of the initial movement, either along the X or the Y axis. Scrolling is then constrained to only this one axis as long as the movement of the input device is continuous. This avoids problems associated with moving in awkward diagonal steps through the pages, and improves the usability and efficiency of the user experience. In another alternative, scrolling may be constrained by requiring an additional horizontal movement before crossing a threshold between one time slot column and the next, either backward or forward in scheduled time.

Program cells 250 may be graphically differentiated, marked with a symbol, or remain unmarked. This differentiation may be provided by the content provider or by the user to signify and to mark favorite programs or media files and sources (either purposely placed, or heuristically discerned from past interactive viewing and interactive behavior and picked by the system on account of similar criteria matching, etc.). Further, selection of certain elements may launch secondary graphics, information, animations, or elements. This allows an operator or content provider to embed offers or other associated information with specific content.

Figure 3:
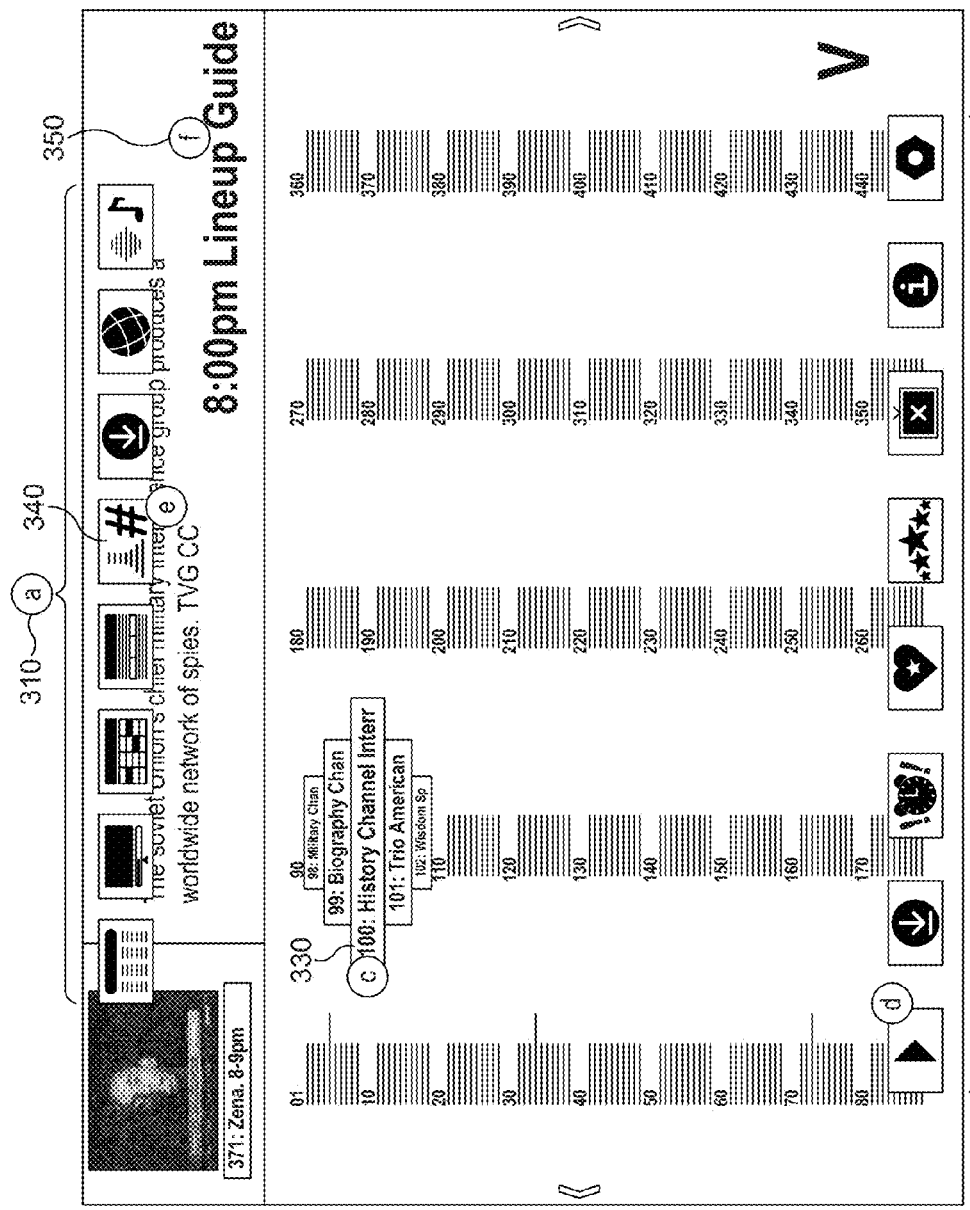
FIG. 3 illustrates mode and function icons.

FIG. 3 illustrates mode and function icons. As illustrated, certain functions are represented by top row mode icons 310 and bottom row function icons 320. Icons 310 and 320 are normally concealed.

However, icons 310 and 320 can be invoked by the user through a control button on the pointing device. For example, when a mouse-type pointing device is used while navigating around any of the various overviews, the user invokes icons 310 and 320 by "left-clicking" the pointing device.

Top row icons 310 represent different types of programming guides, featured services, and high-level modalities of the system, including the various guide overview configurations, PVR functions, recorded items list, web browser, music, photos, etc. Further details on these modalities are provided below. Bottom row icons 320 represent functions or access to functional sequences that are contextually associated or available to invoke for focus cell 330. Bottom row icons 320 may include functions such as play, record, remind, favorites, rate this as a favorite, block, more info, etc. These functions will change according to the current active mode, and the current focus item. Icons 310 and 320 may be activated by selecting the mode or function desired and left-clicking the pointing device.

Bottom row icons 330 may also be activated by a shortcut method, including any combination of pressing and holding down a dedicated button or left-clicking. Icons 320 and 330 may be cancelled or dismissed by a similar shortcut method, including any combination of left-clicking or gesturing the pointing device. Gesturing may include a "wagging"—shaking the pointing device in a back and forth horizontal motion of the input device.

When functions such as 'play' or 'tune to' are invoked, the action will take place immediately in association with the current enlarged focus item 330. For more complex or multi-step functions such as record, remind, rate this, and block/restrict, subsequent user actions is required. These subsequent user actions are facilitated by menus or step-through interactive sequences. These menus or step-through interactive sequences may appear as pop-up or floating panels, with a variety of text instructions, questions, or choices, and active elements representing selectable options.

Top row mode icons 310 are interactive in the same way that bottom row of function icons 320 are, with a couple of exceptions. When both rows are invoked via a left-click while in the overview, a top row icon 310 will be highlighted/pulsing or otherwise graphically and behaviorally differentiated 340 to indicate the currently selected/viewed mode. The currently selected mode name/label will also be prominently displayed 350.

As the user moves back and forth between various mode icons 310, they will highlight and enlarge (and possibly exhibit dynamic animated behaviors) along with displaying their mode name/label. While highlighted, the user may select that specific Mode using his pointing device.

Upon a Left-click on another Mode Icon, there will be a transition to that Mode and the Mode icons will remain differentiated momentarily, and can be highlighted as long as the movement remains horizontal. Once the user drops the cursor down off top mode icon area, they will disappear. This approach allows a user to browse and explore the various modes, and even invoke them, and yet still be able to easily choose another icon if desired during the time their virtual cursor remains in the upper Mode icon area of the screen.

Figure 4:
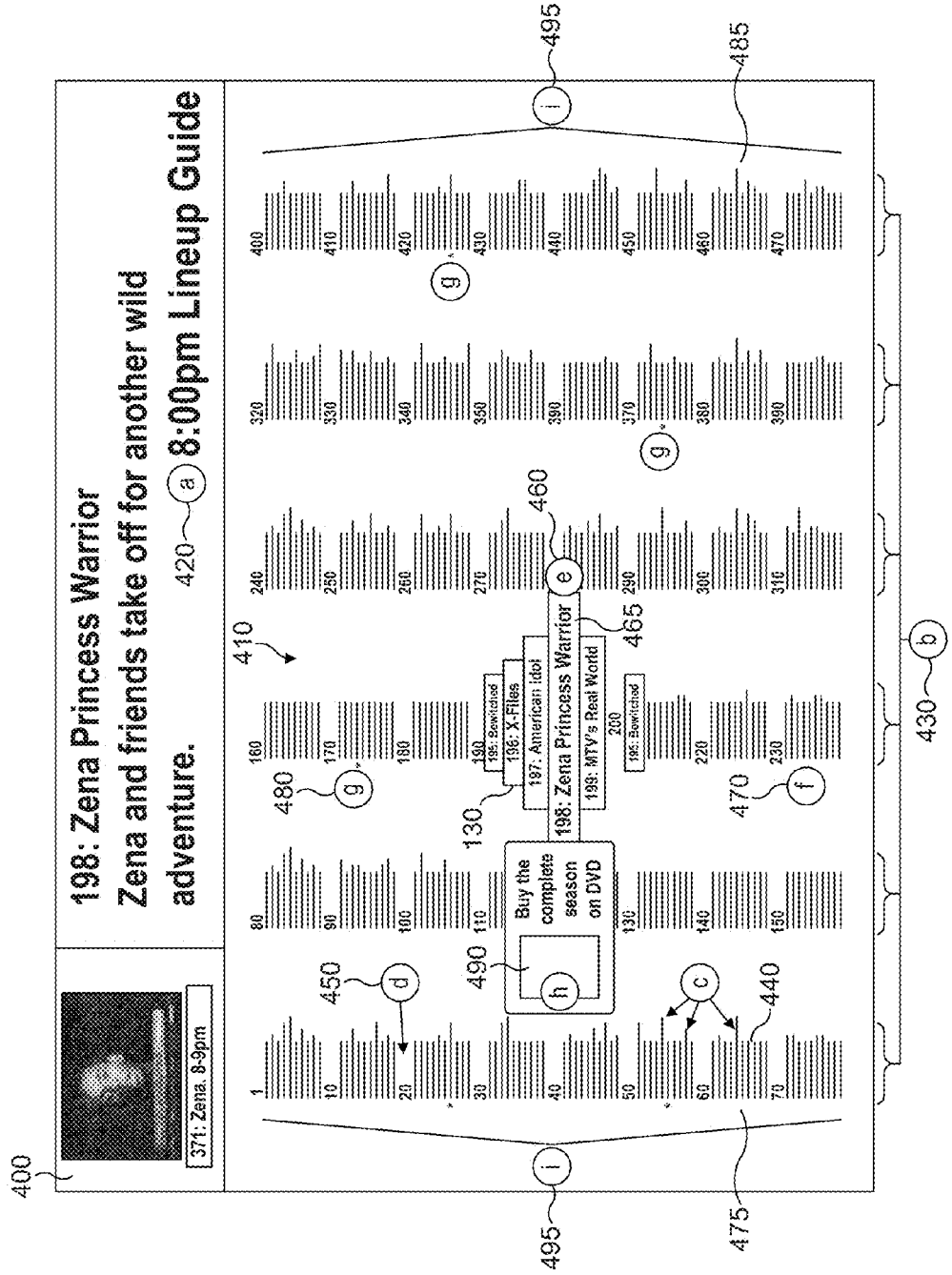
FIG. 4 illustrates the Lineup Guide interface.

FIG. 4 illustrates a Lineup Guide interface 400. Each single-page view 410 represents approximately 500 separate channels or sources at a particular time slot 420 (to the half-hour, e.g.: 8:00 pm). Lineup Guide interface 400 presents programs and media (or other available data objects or opportunities) in a series of vertical columns 430. Columns 430 consist of small graphical elements 440 and are shown as small horizontal lines. Each element 440 represents a scheduled or available program or media object for a channel or source. Vertically stacked elements 440 are separated every ten lines by a spacer 450. Spacers 450 are variable, and are included to allow a user to easily navigate the large numbers of elements 440 with minimal guiding context.

As the pointing device is activated and moved, a hyperbolically enlarged focus area 460 moves amongst elements 440 within interface 400. Elements hyperbolically enlarged at any given time are focus elements 465, so that there is always a current focus element 465 for which actions can be contextually performed. Movement of the virtual cursor is tuned so that it preferably moves up and down sequential elements 440 in columns 430 as distinguished from moving across columns. Program elements 440 above and below the current enlarged focus element 465 are progressively expanded 130 and will also have visible labels, titles, or other additional information. An extra virtual horizontal space 470 is added between columns 430, in order to require the user to pull the cursor of his pointing device further left or right before crossing space 470 separating columns 430. As space 470 is crossed by the cursor, closest vertical element 440 in that column will be hyperbolically enlarged 460 and will become the current focus element 465. This differentiation between vertical and horizontal movement allows the user to more easily browse sequential elements 440 in particular columns 430 without inadvertently pulling sideways and jumping to an adjacent column 430.

Elements 440 may also be graphically differentiated or marked with an adjacent symbol 480. Focus elements 465 when enlarged 465 may invoke, display, or launch secondary graphics, information, animations, or commercial advertisements 490. This allows a user or content provider to embed offers or promotions that people at home can easily see, navigate to, and automatically open upon rollover. This approach could also be utilized to signify and mark favorite programs or media files/sources (either purposely placed, or heuristically discerned from past interactive viewing and interactive behavior and picked by the system on account of similar criteria matching, etc.).

During operation, a user can move forward and backward through scheduled time slots 420 by left-clicking the pointing device on time paging bars 495 located along either side of overview 400. Extra horizontal space 470 is added between farthest right column 485 and corresponding right time paging bar 495 and farthest left column 475 and corresponding left time paging bar 495, in order to require the user to pull the cursor of his pointing device further left or right before crossing space 470. This space may be actual or virtual (i.e. undisplayed but detected for the purpose of moving the virtual cursor.)

In another embodiment that lists more than 500 elements 440, additional paging bars can be placed above and below interface 400 with similar virtual space to avoid inadvertently highlighting them when near the top or bottom of columns 430. Left-clicking the top paging bar and bottom paging bar will move overview 400 up or down one pageview 410 at a time. In this manner, several thousand elements 440 can be efficiently displayed with graphically differentiated or marked with an adjacent symbol 480.

Figure 5:
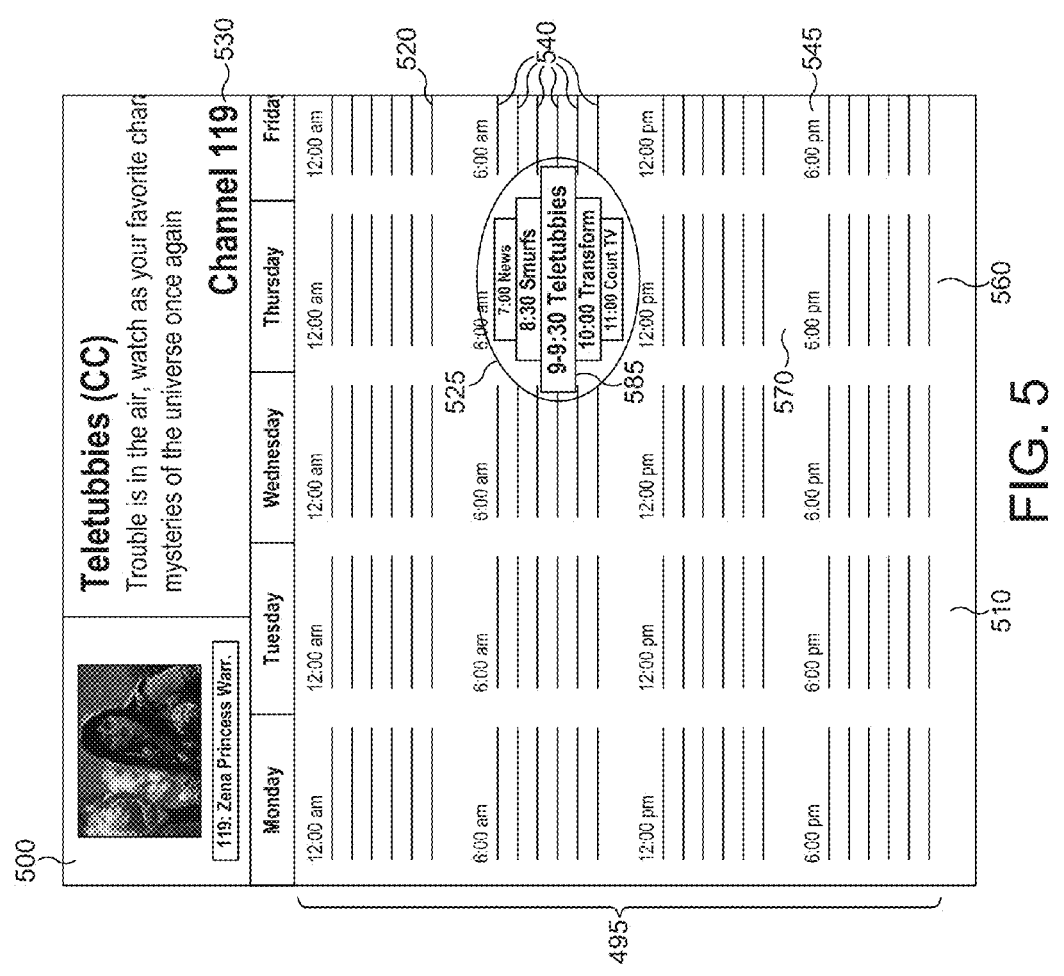

FIG. 5 illustrates a Channel Guide Overview interface 500. Each single-page view 510 represents programs or media elements 520 for a single channel 530. Elements 520 are displayed as small horizontal lines. Each element 520 corresponds to a particular chronologically-ordered time slots 540 (e.g. 8:00 a.m., 8:30 a.m., 9:00 a.m., etc., representing half-hour increments of television programming). Channel Guide Overview interface 510 presents elements 520 in a series of vertical columns 560. Columns 560 list elements 520 for a particular day (e.g. Monday, Tuesday, Wednesday, etc.). Time slot displays 545 distinguish groups of elements 525. (In another embodiment, a Y-axis column on the left side of interface 500 lists chronologically-ordered time slots 540 as in FIGS. 1 and 2.) Extra virtual vertical space 570 is added between groups 525 in order to improve the separation of groups 525 in the interface. Space 570 also requires the user to pull the cursor of his pointing device further up or down before crossing into a different group 525.

As the pointing device is activated and moved, a hyperbolically enlarged focus area 580 moves across elements 520 within interface 500. Elements are hyperbolically enlarged by either movement of the cursor or by movement of the entire display as previously discussed. There is always a current focus element 585 for which actions can be contextually performed.

Elements 520 may also be graphically differentiated or marked with an adjacent symbol 590. Focus elements 585 when enlarged 580 may invoke, display, or launch secondary graphics, information, animations, or commercial advertisements and operate and provide the same functionality in substantially the same manner as previously discussed in the lineup guide overview.

During operation, a user can move forward and backward in time by left-clicking the pointing device on paging bars 495. Paging bars 495 operate and provide the same functionality in substantially the same manner as previously discussed in the lineup guide overview. Top row mode icons 310 and bottom row function icons 320 can also be invoked and used as previously discussed.

Another embodiment, a Lookahead Overview, is similar to the Channel Guide overview of FIG. 5. Each vertical column (containing up to 70 or more programs/media elements) represents one scheduled time slot. Paging bars on either side of the display will either incrementally move one column at a time or page an entire display of time slot columns. Paging bars above and below the overview display will facilitate paging up or down a screen of channels/sources at a time. Program/media elements covering more than one column are horizontally stretched across from column to column, visually linking both columns.

The Lookahead Overview moves a hyperbolically enlarged focus state around the display, and utilizes paging bars in a manner similar to Lineup Guide 400, discussed above. The hyperbolically enlarged focus state progressively expands vertical and horizontal elements as previously discussed in Grid Guide interface 100.

As was described in the descriptions of other overview embodiments, movement of the pointing device cursor may be constrained so that a user can easily move horizontally without changing times of day.

During operation, a user can move forward and backward in time by left-clicking the pointing device on paging bars. Paging bars operate and provide the same functionality in substantially the same manner as previously discussed in the lineup guide overview. Top row mode icons and bottom row function icons can also be invoked and used as previously discussed.

In another embodiment, On Demand Movie and Special Event Guide Overview categorically organizes and displays programs, movies, special events, media elements, or items that are available on a nonscheduled, on-demand basis. Paging bars are limited to one axis, allowing the user to view one screen after another.

In another embodiment, a second set of paging bars can be utilized to page/cycle between categories of on-demand programming. In this manner, use of the paging bars would cycle between categories assigned to that axis (e.g.: all categories, all movies, all dramas, all comedies, etc.)

In another embodiment, Thematic Programming Guide Overviews are filtered and ordered to show programming/media by themes (e.g.: Drama, Comedy, Action/Adventure, Mystery/Suspense, Love/Romance, Independent, Foreign, Sports, Children, Teen, Adult, etc.). These themes may be configurable as a Library, Grid Guide Overview, Lineup Guide Overview, single time slot, Channel Guide Overview or Source). Each overview page lists 500 or more programs/media elements. Left and right paging bars move backwards and forwards in scheduled time slots. Upper and lower paging bars cycle through thematic categories. Each thematic screen is numbered out of the total number of themes (e.g.: Drama—117, Comedy—217, etc.). In another embodiment several icons or graphical representations of the available themes are displayed and the theme currently being displayed is highlight.

In another embodiment, All Kids Programming Guide Overview is screened/filtered to include only programming and media elements and items that are child-appropriate in content. All Kids Programming Guide Overview is capable of being displayed in all the various embodiments previously described.

In another embodiment, Premium Channel Guide Overview is filtered and ordered to show Premium Channel programming/media (e.g. All Aggregated Programming, Movies, Shows, Specials, etc.) filtered and sorted by themes (e.g. Drama, Comedy, Action, Mystery/Suspense, etc.). Premium Channel Guide Overview is capable of being displayed in all the various configurational and thematic embodiments previously described.

In another embodiment, Sports Guide Overview is filtered and ordered to show Sports programming/media by all or specific sports (e.g.: All Sports, Football, Baseball, Basketball, Hockey, Soccer, Tennis, Formula I, NASCAR, etc.). Sports Guide Overview is capable of being displayed in all the various configurational embodiments previously described.

In another embodiment, All Movies Guide Overview is filters programming for Movies Only (e.g. Drama, Comedy, Action, Mystery/Suspense, etc.). All Movies Guide Overview is capable of being displayed in all the various configurational and thematic embodiments previously described.

In another embodiment, Favorite Programs Overview is filtered and ordered to show programming/media that has been marked/chosen as a user favorite, or determined by some heuristic means such as viewing patterns. All Movies Guide Overview is capable of being displayed in all the various configurational and thematic embodiments previously described.

In another embodiment, Recorded Programs Guide Overview is filtered and ordered to show programming/media that has been recorded and archived. Recorded Programs Guide is configured as a listing. Recorded Programs Guide Overview is further filtered and ordered by available categorical and differentiating means as previously described in all the various configurational and thematic embodiments.

In another embodiment, Recording Queue Overview is filtered and ordered to show programming/media that has been marked/chosen to be recorded when it is broadcast. Recording Queue Overview also functions as a download queue from online sources. Recording Queue Overview is configurable as a listing. Recording Queue Overview is further filtered and ordered by available categorical and differentiating means as previously described in all the various configurational and thematic embodiments.

In another embodiment, Parental Restricted-access Overview Guide is filtered and ordered to show programming or media that has been marked/chosen as blocked, restricted from use without a special unlocking code, and either chosen by the user (generally the master user) and/or determined by some heuristic means such as previous blocking/locking criteria (discerned by some means and subsequently blocked/locked). Parental Restricted-access Programs Overview is further filtered and ordered by available categorical and differentiating means as previously described.

In another embodiment, Special Offers Overview is filtered and ordered to show all the free, commercial, and other types of offers and promotions that a service provider or content provider and its partners are providing within the programming/media selection. These offers can be scattered throughout the system and available at different times or under different conditions, but aggregated in this listing for simpler and more direct awareness to the user for review and access. Special Offers Overview is further filtered and ordered by available categorical and differentiating means as previously described in all the various configurational and thematic embodiments.

In another embodiment, Video, Radio, Audio, and Streaming Media Programming Overview is filtered and ordered to show commercially available catalogs/sources or personally owned videos. Personally owned videos are stored files or online access enabled files, or combinations of both. Video, Radio, Audio, and Streaming Media Programming Overview covers such valuable media categories as broadcast radio, on-demand radio programming, audio content, audio and/or video/multimedia" and other types of streaming/on-demand media. Podcasting refers to programming that is recorded, encoded digitally, and available for download and play in a regular or semi-regular schedule. Video, Radio, Audio, and Streaming Media Programming Overview is further filtered and ordered by available categorical and differentiating means as previously described in all the various configurational and thematic embodiments.

Figure 6:
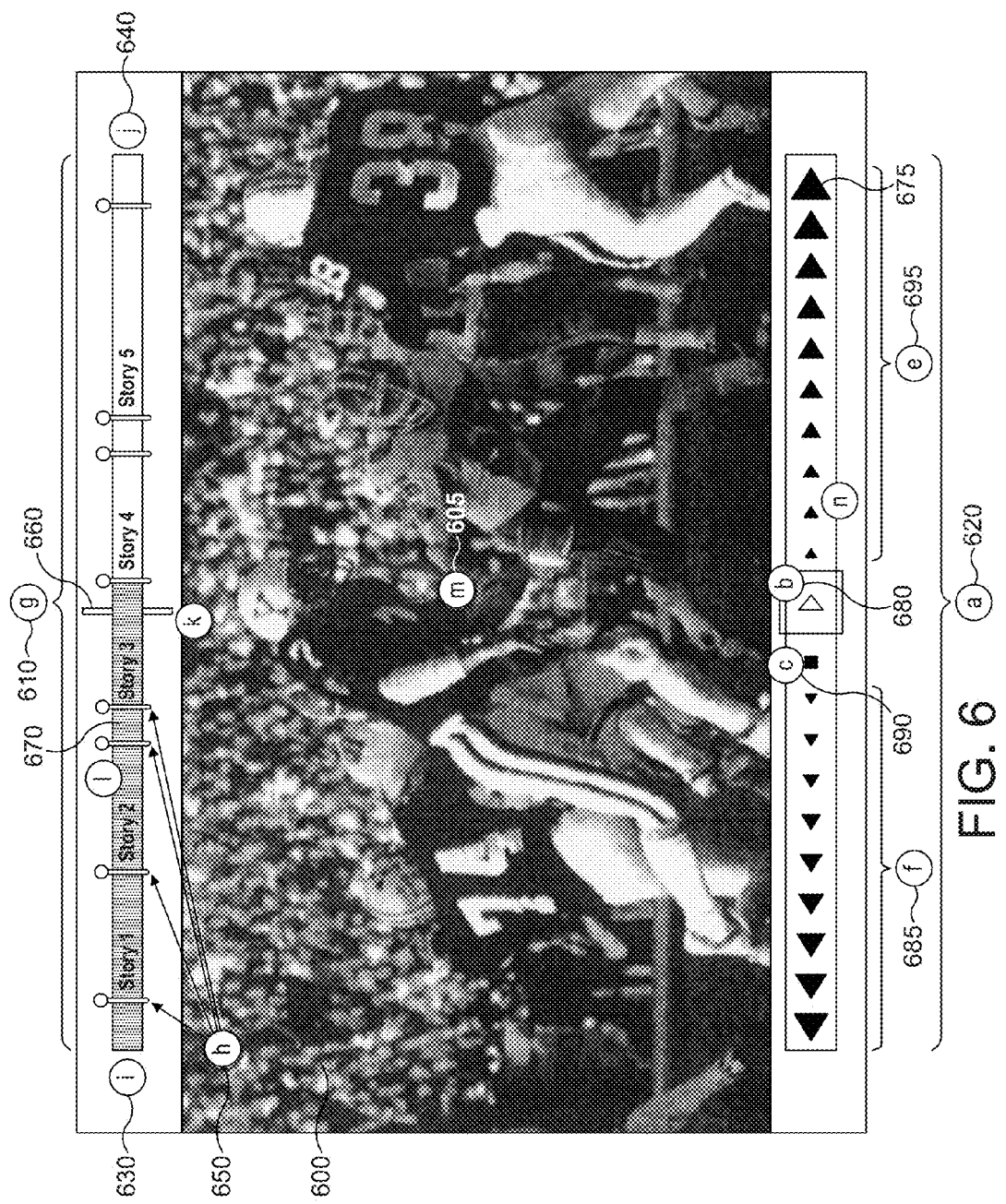
FIG. 6 illustrates the Personal Video Recorder interface.

FIG. 6 illustrates Personal Video Recorder (PVR) interface 600. Interface 600 is invoked by the user through a control button on the pointing device. For example, when a mouse-type pointing device is used to navigate the various overviews, the user invokes overview 600 by "left-clicking" the pointing device. When interface 600 is invoked, upper PVR controls 610 and lower PVR controls 620 appear on the screen. By default, when the user invokes PVR interface 600, a program or media element will be playing and still visible 605.

Controls 610 are invoked when a user navigates the cursor of a pointing device towards the top of interface 600. Similarly, controls 620 are invoked when a user navigates the cursor of a pointing device towards the bottom of interface 600. When the user navigates the cursor towards control 610 or 620, the respective controls will highlight in some overall manner, indicating that it is now the active PVR control and is interactively controllable via horizontal dragging movement and Left-clicks of the pointing device.

Controls 610 consist of a play length representation 630, shown as a gauge-style graphic. Play position 660 within play length representation 630 represents the current play position. Play position 660 also illustrates the percentage of the program/media element completed. Left end 630 of control 610 represents the program/media element's beginning. Right end 640 of control 610 represents the program/media element's end. In another embodiment, if the program or media element is being downloaded, or for some other reason the program or media element is not completely accessible and navigable, a secondary graphical element will be visible, representing the remaining portion as a percentage of the whole length (e.g.: like the mercury in a thermometer, extending rightward from the left end of the gauge).

Located along play length representation 630 are markers 650. Markers 650 represent specific locations/points or regions/segments of special interest. The user may activate the dragging capabilities associated with a pointing device and move play position 660 in reverse or forward through play length representation 630. A left-click may be used to signal "Play From This Point" and end the dragging through play length representation 630. "Gravity," or a programmed means to cause play position 660 to more easily stay on specific markers 650 along play length representation 630, may also be employed to provide the user with an easier and more efficient means to stop in meaningful places.

As in other overviews, programming or scheduled items already over or in the past may be graphically identified.

As play position 660 crosses markers 650, graphical or textual information may be displayed. Markers 650 may also be highlighted. When markers 650 is highlighted, the user may left-click and hold to invoke a pop-up menu or other graphical panel or element containing options, link, information, or cause an action to occur, or sequence to begin.

There is no essential limit to the number of markers 650 that could be encoded, symbolized, and/or graphically represented along the play length representation 630. In an embodiment where there are a large numbers of markers 650 along play length representation 630, markers 650 may hyperbolically enlarge as the user rolls over them with the cursor of a pointing device. In another embodiment where there are a large number of markers 650, markers 650 are compiled from more than one source and are opened to third-parties that provide metadata.

Lower PVR control 620 allows the user to control play speed and direction. Control 620 consists of four areas, two of which, normal play speed 680 and pause/stop 690 have single positions. When the user invokes PVR interface 600, a program or media element will be playing and still visible 605. Normal play speed 680 of control 620 will be highlighted, or otherwise graphically differentiated so as to indicate that it is the currently active setting.

As the user activates the pointing device and navigates the cursor towards the left, the pause/stop 690 position will be highlighted and the program or media element will halt. Dragging the cursor past these two positions leftward will highlight and activate the variable speed reverse controls 685. Dragging the cursor past these two positions rightward will highlight and activate the variable speed forward controls 695. Unlike traditional fast-forward and reverse, these will not be either fixed speeds, nor a few speeds, but continuous ranges of backward and forward speeds. The user will be able to simply control the speed at which program 605 is playing by dragging back and forth within these portions of control 620.

In interface 600 "slow motion," or forward motion that's slower than normal playing speed 680 is represented by and located at the left end of variable speed forward section 690 of controls 620. Section 690 is a variable speed control from stopped position 690 to the fastest possible forward speed 675.

When either upper controls 610 or lower controls 620 are active, the non-active PVR control will still be visible (though perhaps dimmed, or not displayed as highlighted/active), and may be configured so as to reflect such accurate information as current playing position 660.

Various types of data can be presented in accordance with the preferred invention. For example, different indices can be used other than the channel/source, time-slot, or day of week that have been illustrated and other data can be entered as content. For example, music can be used as content and indices can be performer or type of music.

Figure 7:
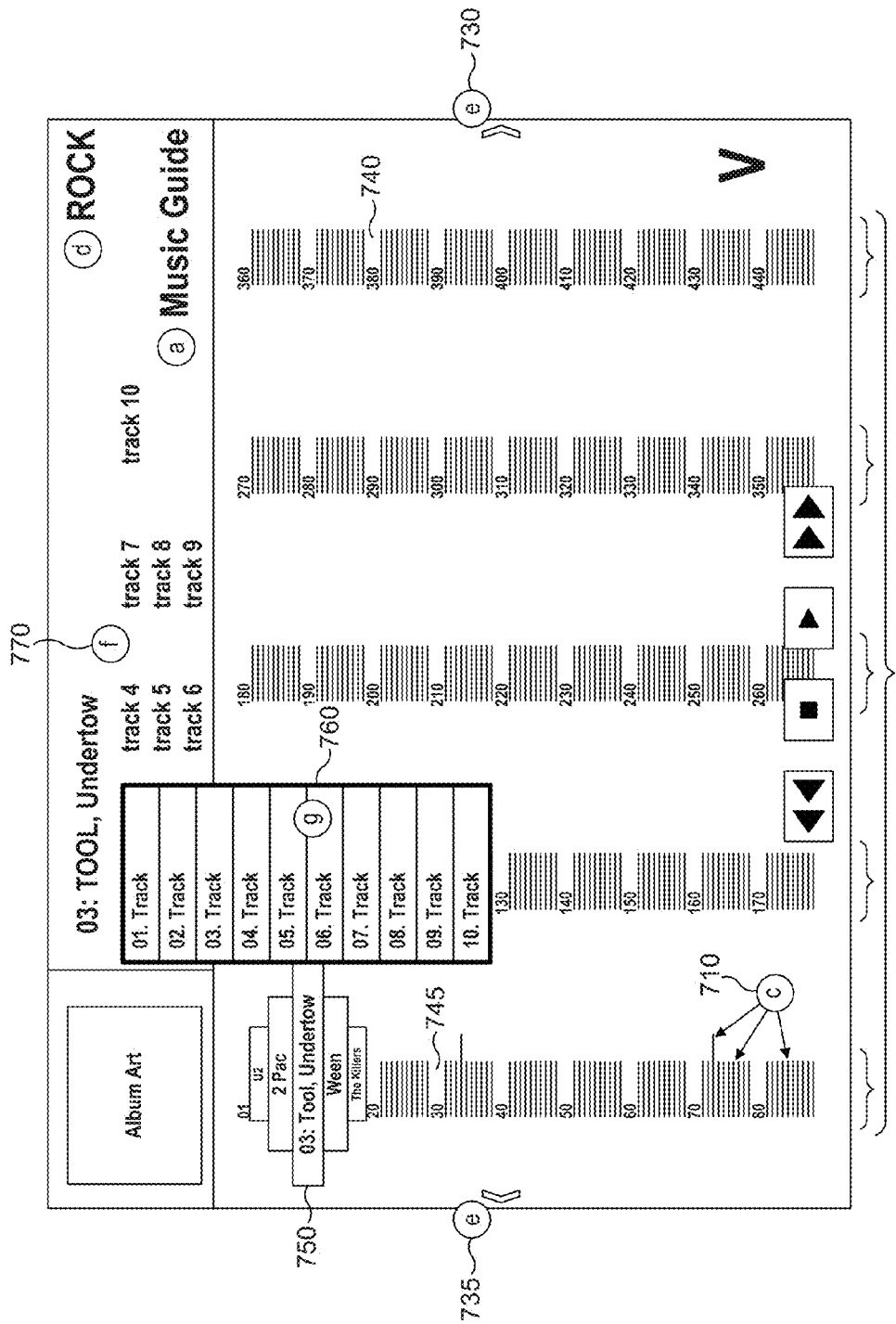
FIG. 7 illustrates the Music Guide interface.

FIG. 7 illustrates Music Guide interface 700 wherein a large database of music is indexed according to the present invention. In this example, interface 700 presents compressed elements 710 organized in vertical columns 720. Each element 710 is shown as a horizontal line and represents an album. During operation, a user can move forward and backward through columns 720 of albums 710 by left-clicking the pointing device on time paging bars 730 and 740 located along either side of overview 700. Vertical spaces 740 and 745 are added between farthest right column 720 and corresponding right paging bar 730 and farthest left column 720 and corresponding left paging bar 735, in order to require the user to pull the cursor of his pointing device further left or right before moving through columns 720.

As previously discussed, a user can focus in on an element of interest 750 within overview 700 using a pointing device. Element 750 is hyperbolically enlarged and elements 760 above and below element 750 are progressively decompressed in relation to their proximity to element 750. Album or grouping labels 770 are displayed for focus element 750. If the user pauses momentarily on focus element 750 a secondary pop-up scrollable menu 760 of that element's tracks will appear adjacent to element 750. The user may then navigate his cursor to menu 760, whereupon vertical navigation will move up and down menu 760, highlighting/selecting tracks for element 750. Left-clicking on a track will invoke top row mode icons and the bottom row function icons previously discussed above.

Bottom row icons 330 may also be activated by a shortcut method, including any combination of pressing and holding down a dedicated button, left-clicking, or gesturing. Gesturing may include a "wagging"—shaking the pointing device in a back and forth horizontal motion of the input device.

In another embodiment, Personal Memories Overview is a photograph/image, audio/video, and multimedia management and review of personal media. Personal Memories Overview is filtered and ordered to allow users to manage, sort, access, and view/play their personal media. Personal Memories Overview allows navigation between media modes and other subcategories. Subcategories of Personal Memories Overview include: (1) Personal Digital Photo Overview; (2) Personal Digital Audio/Video Overview; and (3) Personal Multimedia Overview. The configuration and layout of these Overview embodiments will function in ways similar to other described overviews, but display previews, thumbnails, and/or other identifying labels or information as the user navigates through the Overview display. Left-clicking when a particular media element is currently the enlarged/highlighted focus item will similarly invoke function icons, secondary dialogs, panels, menus or means to open, play, preview, or otherwise interact with or perform functions on the selected media. Personal Memories Overview is further filtered and ordered by available categorical and differentiating means as previously described in all the various configurational and thematic embodiments.

In another embodiment, Weather Overview provides the user with an easy way to browse, ascertain, and access large amounts of regional or world-wide weather and travel conditions information. In an embodiment, Weather Overview can be configured as small list-style arrangements of representative elements. Elements represent places and related weather information. In another embodiment, Weather Overview can be contextually displayed as a map capable of containing a dense set of interactive rollover elements/locations/regions, similar to rollover elements previously discussed.

In another embodiment, Regional Activity Overview allow a to browse, ascertain, and access large amounts of regional or world-wide events and activities information. Regional and world-wide events and activities include movies, theater, restaurants, clubs, concerts, and event. In an embodiment, Regional Activity Overview can be configured as small list-style arrangements of representative elements. Elements represent places and related events/activities information. In another embodiment, Regional Activity Overview can be organized and contextually displayed as a map capable of containing a dense set of interactive rollover elements, locations, and regions similar to rollover elements previously discussed.

In another embodiment, Shopping and Commercial Sales and Online Bidding Overviews allow a user to monitor large numbers of individual online auctions, or a subset listing of auctions the user was participating in as either a seller or buyer. Shopping and Commercial Sales and Online Bidding Overviews focus on shopping, stores, catalogs, free sources, item auctions and bidding systems, travel services, other online services. Shopping and Commercial Sales and Online Bidding Overviews are further filtered and ordered by available categorical and differentiating means as previously described in all the various configurational and thematic embodiments.

In another embodiment, Personal, Want Ads, Dating, and Meetup Overviews allow a user to browse and ascertain information from large databases for profiles, categories, event schedules, etc. A dense set of interactive rollover elements representing profiles, categories, event schedules, etc., can be contextually organized in all the various configurational and thematic embodiments previously discussed. Automatic rollover pop-ups could include photographs or other additional information.

In another embodiment, Search Engine Results Overview allows a user to browse and ascertain the results of searches conducted on the gTV system. Search Engine Results Overview is further filtered and ordered by available categorical and differentiating means as previously described in all the various configurational and thematic embodiments.

In another embodiment, Messages Overview allows a user to browse and ascertain larger sets of stored and received messages. Messages Overview is particularly useful for large email archives and can be further filtered and ordered by available categorical and differentiating means as previously described in all the various configurational and thematic embodiments. In an embodiment, Messages Overview can be configured to coordinate and synchronize with other email and/or messaging systems, either through online connections, or by the synchronization with portable devices.

In another embodiment Address Book/Buddy List Overview and Communication/Videophone/Videoconferencing Overview allow users to scan large address books and buddy lists in order to view the status of constituent listees, and thereby contact them/establish chats, conferences, etc. In an embodiment, Address Book/Buddy List Overview can be configured to coordinate and synchronize with other address books and/or buddy lists, either through online connections, or by synchronization with portable devices.

In another embodiment, Calendar/Schedule Overview allows a user to browse and ascertain large sets of chronologically-ordered data and reminders. As previously discussed, page bars on either side of the display allow a user to scroll forward and backward in time between year, month, week, and day views. In an embodiment, Calendar/Schedule Overview can be configured to coordinate and synchronize with other calendars and schedules, either through online connections, or by the synchronization with portable devices.

While the present invention has been described in terms of the preferred embodiments above, those skilled in the art will readily appreciate that numerous configurations, modifications, substitutions and additions may be made to the disclosed embodiment without departing from the spirit and scope of the present invention. For example, although the Interactive Overview Visualization Model display interface has been described above for use with a computer, those skilled in the art will readily appreciate that the display interface may be utilized in any similar electronic device and that the present invention is in no way limited to mechanisms described above. Formatting of the indexes can be accomplished in various ways, such as the use of a vertical column as illustrated in FIG. 1 or the embedding of the index as in FIG. 5. It is intended that all such modifications, substitutions and additions fall within the scope of the present invention which is best defined by the claims below.

What is claimed is:

1. A method for displaying a number of sources and associated content on an interactive graphic user interface in response to an input device, the method comprising:
presenting for display a number of first visual elements in an initial state in a vertical array on the user interface, each first visual element corresponding to a selectable source;
presenting for display a number of second visual elements in the initial state on the user interface, a number of the second visual elements being associated with and horizontally disposed from each of the first visual elements, each second visual element corresponding to a specific program;
sequentially selecting at least one first visual elements in response to input from the input device, the selections occurring sequentially along the vertical direction; and
converting a display state, from the initial state, of the selected at least one first visual element and the associated second visual elements and presenting for display a display area associated with the selected at least one first visual element in a first changed state in enlarged formats such that a user can read content identifying the source displayed in the selected at least one first visual element and content identifying the specific program displayed in the associated second visual elements and wherein the appearance of first visual elements other than the selected at least one first visual elements and second visual elements associated with the first visual elements other than the selected at least one first visual elements is maintained in the initial state such that no content identifying the source in the first visual elements and the specific program in the second visual elements is displayed and the number of first visual elements and second visual elements that can be displayed in the initial state is maximized.

2. The method as in claim 1, wherein the selectable source corresponds to a video channel.

3. The method as in claim 2, wherein the associated second visual elements are arranged in vertical columns which correspond to different time periods.

4. The method as in claim 3, wherein the columns of associated second visual elements scroll horizontally in response to a user input from the input device.

5. The method as in claim 4, wherein the user interface is constrained to be responsive to only sequentially selecting adjacent first visual elements or to horizontal scrolling the columns of associated second visual elements at any one time.

6. The method as in claim 3, wherein a second state change occurs with respect to visual elements adjacent to the selected at least one first visual element and the associated second visual elements in a vertical direction, the second changed state identifying the source in a smaller format than that for the selected at least one first visual element and content identifying the specific program in a smaller format than that for the associated second visual elements.

7. The method as in claim 1, wherein the selected at least one first visual elements and the associated second visual elements are displayed in a fixed position and remaining first and second visual elements in the user interface are displayed scrolling vertically below the fixed position.

8. The method of claim 1, wherein the number of first visual elements and the number of second visual elements are displayed in the initial state as at least one of a line and a row of dots.

9. The method of claim 1, wherein a third state change occurs in response to a user input with respect to one of the second visual elements associated with the selected at least one first visual element, the third state change providing a further visual element that displays further information about the specific program identified by the one of the second visual elements.

10. A method for displaying a number of sources and associated content on an interactive graphic user interface in response to an input device, the method comprising:
presenting for display a number of first visual elements in an initial state in a vertical array on the user interface, each first visual element corresponding to a selectable source;
presenting for display a number of second visual elements in the initial state on the user interface, a number of the second visual elements being associated with and horizontally disposed from each of the first visual elements, each second visual element corresponding to a specific program;

sequentially selecting at least one first visual elements in response to input from the input device, the selections occurring sequentially along the y axis; and presenting for display a first state change, from the initial state, with respect to the selected at least one first visual element, and second visual elements associated with the selected first visual element, and a second state change, from the initial state, with respect to visual elements vertically adjacent to the selected at least one first visual element and second visual elements associated with the first visual elements vertically adjacent to the selected at least one first visual element, wherein, responsive to selection, the first state change and second state change is displayed as expanded on the user interface, both vertically and horizontally, a horizontal segment that is scrolled vertically over the display, the horizontal segment comprising the selected first visual element, the visual elements vertically adjacent to the selected at least one first visual element and the associated second visual elements such that a user can read information identifying the source displayed in the selected at least one first visual element and the visual elements vertically adjacent to the selected first visual element, and read information identifying the specific program for the second visual elements associated with the selected first visual element and the second visual elements associated with the first visual elements vertically adjacent to the selected at least one first visual element, the second state change providing the content on the display in a smaller format than the first state change, and wherein the display of first visual elements other than the selected at least one first visual element and the first visual elements vertically adjacent to the selected at least one first visual element, and second visual elements other than the second visual elements associated with the selected first visual element and the second visual elements associated with the first visual elements vertically adjacent to the selected at least one first visual element is maintained in the initial state such that no content identifying the source in the first visual elements and the specific program in the second visual elements is displayed and the number of second visual elements and first visual elements displayed is maximized.

11. The method as in claim 10 where the second visual elements are arranged in vertical columns which correspond to different time periods.

12. The method as in claim 11 wherein the vertical columns of second visual elements scroll horizontally in response to a second input from the input device.

13. The method as in claim 10 wherein the selectable source corresponds to a video channel.

14. A method for displaying a number of sources and associated content on an interactive graphic user interface in response to an input device, the method comprising:

presenting for display a number of visual elements in an initial state in a two dimensional array on the user interface, each of the number of visual elements having a specific content associated with the visual element;

sequentially selecting at least one first visual element from the number of visual elements in response to input from the input device;

presenting for display a first state change, from the initial state, with respect to the selected at least one first visual element, the selected at least one first visual element being displayed proximate to its location in the two dimensional array such that the first state change is displayed as expanded on the user interface, vertically and horizontally; and presenting a display a second state change, from the initial state, with respect to visual elements vertically adjacent to the selected at least one first visual element, wherein, responsive to selection of the at least one first visual element, the visual elements vertically adjacent to the selected at least one first visual element are displayed proximate to their location in the two dimensional array such that the second state change is displayed as expanded on the user interface, vertically and horizontally, and a user can read information identifying the specific content for the selected first visual element displayed as part of first state change and information identifying the specific content for the visual elements vertically adjacent to the selected visual element displayed as part of the second state change, the second state change providing content on the display in the visual elements vertically adjacent to the first visual element in a smaller format than the first state change, and wherein the display of first visual elements other than the selected at least one first visual element and visual elements vertically adjacent to the selected at least one first visual element is maintained in the initial state such that no information identifying the specific content in the first visual element is displayed and the number of visual elements displayed is maximized.

15. A method for displaying a number of sources and associated content on an interactive graphic user interface in response to an input device, the method comprising:

presenting for display a number of first visual elements in an initial state in a vertical array on the user interface, each first visual element corresponding to a selectable source;

presenting for display a number of second visual elements in the initial state on the user interface, a number of the second visual elements being associated with and horizontally disposed from each of the first visual elements, each second visual element corresponding to a specific program, the appearance of the number of second visual elements and the number of first visual elements being similar in appearance and of a first size such that no content is displayed in the second visual elements and first visual elements in order to maximize the number of second visual elements and first visual elements on the display interface in the initial state, the content including at least one of text, labels, advertisements, media, graphics, animation, and additional information;

sequentially selecting at least one first visual elements along the y-axis in response to input from the input device; and presenting for display a first state change, from the initial state, associated with the selected at least one first visual element and with the associated second visual elements, wherein, responsive to selection, the selected elements are displayed proximate to their location such that the first state change displays as expanded on the user interface a horizontal segment that is scrolled vertically over the display, the horizontal segment consisting of the selected at least one first visual elements and the associated second visual elements, and wherein said expanded horizontal segment extends horizontally beyond the horizontal limits of unexpanded segments and a user can read information identifying the source displayed in the selected at least one first visual element and information identifying content displayed in the second visual elements associated with the selected at least one first visual element, and wherein the display of first visual elements other than the selected at least one first visual elements and second visual elements associated with the first visual elements other than the selected at least one first visual elements is maintained in the initial state such that no content identifying the source in the first visual elements and the specific program in the second visual elements is displayed and the number of second visual elements and first visual elements displayed is maximized.

16. The method as in claim 15, wherein a second state change occurs with respect to visual elements adjacent to the selected at least one first visual elements and the associated second elements, the second state change present for display information identifying the source displayed in the first visual elements adjacent to the selected at least one first visual element and identifying the specific program displayed in the second visual elements associated with the first visual elements adjacent to the selected at least one first visual element, the content being displayed in a smaller format than the first state change.

17. The method as in claim 16, further comprising scrolling horizontally the columns of second visual elements in response to a second input from the input device.

18. The method as in claim 17, wherein the user interface is constrained to be responsive to only the sequentially selecting step or to the horizontal scrolling step at any one time.

19. The method as in claim 18, wherein either the sequential selecting or the horizontal scrolling is selected in response to a designated motion of the input device in a x axis or y axis direction.

20. A method for displaying a number of sources and associated content on an interactive graphic user interface in response to an input device, the method comprising:
presenting for display a number of visual elements in an initial state in a two dimensional array on the user interface, each of the number of visual elements having a specific content associated with the visual element;
sequentially selecting at least one visual elements in response to input from the input device;
presenting for display a first state change, from the initial state, with respect to the selected visual element; and
presenting for display a second state change, from the initial state, with respect to visual elements adjacent to the selected visual element, wherein the selected at least one visual element and visual elements adjacent to the selected at least one visual element, in the first state change and the second state change, are displayed such that a user can read information identifying the specific content displayed in the selected at least one visual elements and the visual elements adjacent to the selected at least one visual element, wherein the second state change displays content in a smaller format than the first state change, wherein the selected at least one visual elements and the visual elements adjacent to the selected at least one visual element are displayed in a fixed position and remaining elements of the user interface are displayed as scrolling vertically behind the fixed position, and wherein the appearance of first visual elements other than the selected at least one visual element and visual elements adjacent to the selected at least one visual element is maintained in the initial state such that no information identifying the specific content in the first visual element is displayed and the number of visual elements displayed is maximized.

21. A method for displaying a number of sources and associated content on an interactive graphic user interface in response to an input device, the method comprising:
presenting for display a number of visual elements in an initial state in a two dimensional array on the user interface, each of the number of visual elements having a specific content associated with the visual element;
sequentially selecting at least one visual elements in response to input from the input device;
presenting for display a first state change, from the initial state, with respect to the selected at least one visual element; and
presenting for display a second state change, from the initial state, with respect to visual elements adjacent to the selected at least one visual element, wherein, responsive to selection, the selected at least one visual element and the visual elements adjacent to the selected visual element are displayed proximate to their location such that the first state change and the second state change expand a viewing area on the user interface, consisting of the selected at least one visual element and the associated second visual elements, that is scrolled over the display and a user can read the information identifying content displayed in the selected at least one visual element and information identifying content displayed in the visual elements adjacent to the selected at least one visual element, wherein the second state change displays content in a smaller format than the first state change, wherein said expanded horizontal segment extends horizontally beyond the horizontal limits of unexpanded segments in the viewing area, and wherein the appearance of visual elements other than the selected at least one visual element and visual elements adjacent to the selected at least one visual element is maintained in the initial state such that no information identifying the specific content in the visual elements is displayed and the number of visual elements displayed is maximized.

22. An electronic system for displaying a number of sources and associated content on an interactive graphic user interface, the electronic system comprising:
a display device that displays a number of first visual elements in an initial state in a vertical array on the user interface, each first visual element corresponding to a selectable source and a number of second visual elements displayed in the initial state on the display interface, the number of the second visual elements being associated with and horizontally disposed from each of the first visual elements, each second visual element corresponding to a specific program; and
an input device that sequentially selects at least one first visual element along the vertical direction in response to an input from the user
wherein, in response to the selection, the display device displays the selected at least one first visual element and associated second visual elements in a first changed state in a display area associated with the selected at least one first visual element, the selected at least one first visual element and associated second visual elements having enlarged formats in the first changed state such that a user can read content identifying the source displayed in the selected at least one first visual element and content identifying the specific program displayed in the associated second visual elements, and the display device maintains the display of first visual elements other than the selected at least one first visual elements and second visual elements associated with the first visual elements other than the selected at least one first visual elements in the initial state such that no content identifying the source in the first visual elements and the specific program in the second visual elements is displayed and the number of first visual elements and second visual elements associated with the first visual elements displayed on the display device is maximized.

23. The electronic system as in claim 22, wherein the selectable source corresponds to a video channel.

24. The electronic system as in claim 23, wherein the associated second visual elements are arranged in vertical columns which correspond to different time periods.

25. The electronic system as in claim 24, wherein the columns of associated second visual elements scroll horizontally in response to a user input from the input device.

26. The electronic system as in claim 25, wherein the input device interface is constrained to be responsive to only sequentially selecting adjacent first visual elements or to horizontal scrolling the columns of associated second visual elements at any one time.

27. The electronic system as in claim 24, wherein the display device displays a second state change with respect to visual elements adjacent to the selected at least one first visual element and the associated second visual elements in a vertical direction, the second changed state identifying the source in a smaller format than that for the selected at least one first visual element and content identifying the specific program in a smaller format than that for the associated second visual elements.

28. The electronic system as in claim 22, wherein the selected at least one first visual elements and the associated second visual elements are displayed in a fixed position and remaining first and second visual elements in the user interface are displayed scrolling vertically below the fixed position.

29. The electronic system of claim 22, wherein the number of first visual elements and the number of second visual elements are displayed in the initial state as at least one of a line and a row of dots.

30. The electronic system of claim 22, wherein the display device displays a third state change in response to a user input with respect to one of the second visual elements associated with the selected at least one first visual element, the third state change providing further information about the specific program identified by the one of the second visual elements.

31. An electronic system for displaying a number of sources and associated content on an interactive graphic user interface, the electronic system comprising:
a display device that displays a number of first visual elements in an initial state in a vertical array on the display, each first visual element corresponding to a selectable source and a number of second visual elements in the initial state on the display, a number of the second visual elements being associated with and horizontally disposed from each of the first visual elements, each second visual element corresponding to a specific program; and
an input device that sequentially selects at least one first visual elements displayed on the display interface device in response to input from a user, the selections occurring sequentially along the y axis;
wherein, in response to the selection, the display device displays a first state change, from the initial state, with regard to the selected at least one first visual element, and second visual elements associated with the selected at least one first visual element, and a second state change, from the initial state, with regard to visual elements vertically adjacent to the selected at least one first visual element and second visual elements associated with the first visual elements vertically adjacent to the selected at least one first visual element such that the first state change and second state change expand on the user interface, both vertically and horizontally, a horizontal segment that is scrolled vertically over the display, the horizontal segment comprising the selected at least one first visual element, the visual elements vertically adjacent to the selected at least one first visual element and the associated second visual elements and a user can read information identifying the source displayed in the selected at least one first visual element and the visual elements vertically adjacent to the selected at least one first visual element, and read information identifying the specific program for the second visual elements associated with the selected at least one first visual element and the second visual elements associated with the first visual elements vertically adjacent to the selected at least one first visual element, wherein, responsive to selection, the display interface displaying the content for the second state change in a smaller format than the first state change, and the display interface maintains the display of first visual elements other than the selected at least one first visual element and the first visual elements vertically adjacent to the selected at least one first visual element, and second visual elements other than the second visual elements associated with the selected at least one first visual element and the second visual elements associated with the first visual elements vertically adjacent to the selected at least one first visual element in the initial state such that no content identifying the source in the first visual elements and the specific program in the second visual elements is displayed and the number of second visual elements and first visual elements on the display device is maximized.

32. The electronic system as in claim 31 where the second visual elements are arranged in vertical columns which correspond to different time periods.

33. The electronic system as in claim 32 wherein the vertical columns of second visual elements scroll horizontally in response to a second input from the input device.

34. The electronic system as in claim 31 wherein the selectable source corresponds to a video channel.

35. An electronic system for displaying a number of sources and associated content on an interactive graphic user interface, the electronic system comprising:
a display device that displays a number of visual elements in an initial state in a two dimensional array on the display, each of the number of visual elements having a specific content associated with the visual element; and
an input device that sequentially selects at least one first visual element from the number of visual elements in response to an input from a user;
wherein in response to the selection, the display device displays a first state change, from the initial state, associated with the selected at least one first visual element, the selected at least one first visual element being displayed proximate to its location in the two dimensional array such that the first state change expands on the user interface, vertically and horizontally and displays a second state change, from the initial state, with regard to visual elements vertically adjacent to the selected at least one first visual element, the display device displaying the visual elements vertically adjacent to the selected at least one first visual element proximate to their location in the two dimensional array such that the second state change expands on the user interface, vertically and horizontally and a user can read information identifying the specific content for the selected at least one first visual element displayed as part of first state change and information identifying the specific content for the visual elements vertically adjacent to the selected at least one first visual element displayed as part of the second state change, the second state change displaying content in the visual elements vertically adjacent to the selected at least one first visual element in a smaller format than the first state change, and the display interface maintains the display of first visual elements other than the selected at least one first visual element and visual elements vertically adjacent to the selected at least one first visual element is maintained in the initial state such that no information identifying the specific content in the first visual element is displayed and the number of visual elements displayed is maximized.

36. An electronic system for displaying a number of sources and associated content on an interactive graphic user interface, the electronic system comprising:
a display device that displays a number of first visual elements in an initial state in a vertical array on the display, each first visual element corresponding to a selectable source and a number of second visual elements in the initial state on the display, a number of the second visual elements being associated with and horizontally disposed from each of the first visual elements, each second visual element corresponding to a specific program, the appearance of the number of second visual elements and the number of first visual elements being similar in appearance and of a first size such that no content is displayed in the second visual elements and first visual elements in order to maximize the number of second visual elements and first visual elements on the display interface in the initial state, the content including at least one of text, labels, advertisements, media, graphics, animation, and additional information; and
an input device that sequentially selects at least one first visual element along the y-axis in response to an input from the user;
wherein, in response to the selection, the display device displays a first state change, from the initial state, associated with the selected at least one first visual element and with the associated second visual elements, the display device displaying the selected elements proximate to their location such that the first state change expands a horizontal segment on the user interface, consisting of the selected at least one first visual elements and the associated second visual elements, that is scrolled vertically over the display and a user can read information identifying the source displayed in the selected at least one first visual element and information identifying content displayed in the second visual elements associated with the selected at least one first visual element, the expanded horizontal segment extending horizontally beyond the horizontal limits of unexpanded segments, and the display interface maintains display of first visual elements other than the selected at least one first visual elements and second visual elements associated with the first visual elements other than the selected at least one first visual elements in the initial state such that no content identifying the source in the first visual elements and the specific program in the second visual elements is displayed and the number of second visual elements and first visual elements on the display device is maximized.

37. The electronic system as in claim 36, wherein the display device displays a second state change with respect to visual elements adjacent to the selected at least one first visual elements and the associated second elements, the display interface displaying information identifying the source displayed in the first visual elements adjacent to the selected at least one first visual element and identifying the specific program displayed in the second visual elements associated with the first visual elements adjacent to the selected at least one first visual element, the content being displayed in a smaller format than the first state change.

38. The electronic system as in claim 37, wherein the display device displays a horizontal scrolling of the columns of second visual elements in response to a second input from the input device.

39. The electronic system as in claim 38, wherein the input device is constrained to be responsive to only sequentially selecting vertically or to horizontally scrolling at any one time.

40. The electronic system as in claim 39, wherein either the sequential selecting or the horizontal scrolling is selected in response to a designated motion of the input device in a x axis or y axis direction.

41. An electronic system for displaying a number of sources and associated content on an interactive graphic user interface, the electronic system comprising:
a display device that displays a number of visual elements in an initial state in a two dimensional array on the display, each of the number of visual elements having a specific content associated with the visual element; and
an input device that sequentially selects at least one visual elements in response to an input from a user;
wherein, in response to the selection, the display device displays a first state change, from the initial state, with respect to the selected at least one visual element and a second state change, from the initial state, with respect to visual elements adjacent to the selected at least one visual element, the display device displaying the selected at least one visual element and visual elements adjacent to the selected at least one visual element, in the first state change and the second state change such that a user can read information identifying the specific content displayed in the selected visual element and the visual elements adjacent to the selected at least one visual element, the second state change content displayed in a smaller format than the first state change, wherein the selected at least one visual element and the visual elements adjacent to the selected at least one visual element are displayed in a fixed position and the remaining elements of the user interface are displayed as scrolling vertically behind the fixed position, and the display device maintains the display of first visual elements other than the selected at least one first visual element and visual elements adjacent to the selected at least one visual element in the initial state such that no information identifying the specific content in the first visual element is displayed and the number of visual elements displayed is maximized.

42. An electronic system for displaying a number of sources and associated content on an interactive graphic user interface, the electronic system comprising:
a display device that displays a number of visual elements in an initial state in a two dimensional array on the display, each of the number of visual elements having a specific content associated with the visual element; and
an input device that sequentially selects at least one visual element in response to an input from a user;
wherein, in response to the selection, the display device displays a first state change, from the initial state, with respect to the selected at least one visual element and a second state change, from the initial state, with respect to visual elements adjacent to the selected at least one visual elements, the display interface displaying the selected at least one visual element and the visual elements adjacent to the selected at least one visual element proximate to their location such that the first state change expands a viewing area on the user interface, consisting of the selected at least one first visual element and the associated second visual elements, that is scrolled over the display and a user can read the information identifying content displayed in the selected at least one visual element and information identifying content displayed in the visual elements adjacent to the selected at least one visual element, the second state change content displayed in a smaller format than the first state change, wherein the expanded horizontal segment extends horizontally beyond the horizontal limits of unexpanded segments in the viewing area, and the display device maintains the display of visual elements other than the selected at least one first visual element and visual elements adjacent to the selected at least one first visual element in the initial state such that no information identifying the specific content in the visual elements is displayed and the number of visual elements displayed is maximized.

43. A system comprising:
a display interface that causes the display of a number of first visual elements in an initial state in a vertical array on a interactive graphic user, each first visual element corresponding to a selectable source and a number of second visual elements displayed in the initial state on the user interface, the number of the second visual elements being associated with and horizontally disposed from each of the first visual elements, each second visual element corresponding to a specific program; and
an input device that sequentially selects at least one first visual elements along the vertical direction in response to an input from the user
wherein, in response to the selection, the display interface further causes the display of the selected at least one first visual element and associated second visual elements in a first changed state in a display area associated with the selected at least one first visual element, the selected first visual element and associated second visual elements having enlarged formats in the first changed state such that a user can read content identifying the source displayed in the selected at least one first visual element and content identifying the specific program displayed in the associated second visual elements, and the display interface further causing the display of first visual elements other than the selected first visual elements and second visual elements associated with the first visual elements other than the selected at least one first visual elements to be maintained in the initial state such that no content identifying the source in the first visual elements and the specific program in the second visual elements is displayed and the number of first visual elements and second visual elements associated with the first visual elements displayed is maximized.

44. The system as in claim 43, wherein the selectable source corresponds to a video channel.

45. The system as in claim 44, wherein the associated second visual elements are arranged in vertical columns which correspond to different time periods.

46. The system as in claim 45, wherein the columns of associated second visual elements scroll horizontally in response to a user input from the input device.

47. The system as in claim 46, wherein the input device is constrained to be responsive to only sequentially selecting at least one first visual elements or to horizontal scrolling the columns of associated second visual elements at any one time.

48. The system as in claim 45, wherein the display interface further causes the display of a second state change with respect to visual elements adjacent to the selected at least one first visual element and the associated second visual elements in a vertical direction, the second changed state identifying the source in a smaller format than that for the selected at least one first visual element and content identifying the specific program in a smaller format than that for the associated second visual elements.

49. The system as in claim 43, wherein the selected at least one first visual elements and the associated second visual elements are displayed in a fixed position and remaining first and second visual elements in the user interface are displayed scrolling vertically below the fixed position.

50. The system of claim 43, wherein the number of first visual elements and the number of second visual elements are displayed in the initial state as at least one of a line and a row of dots.

51. The system of claim 43, wherein the display interface causes the display of a third state change in response to a user input with respect to one of the second visual elements associated with the selected at least one first visual element, the third state change providing further information about the specific program identified by the one of the second visual elements.

52. A system comprising:
a display interface that cause the display of a number of first visual elements in an initial state in a vertical array on on an interactive graphic user interface, each first visual element corresponding to a selectable source and a number of second visual elements in the initial state on the display, a number of the second visual elements being associated with and horizontally disposed from each of the first visual elements, each second visual element corresponding to a specific program; and
an input device that sequentially selects at least one first visual element displayed on the display interface device in response to input from a user, the selections occurring sequentially along the y axis;
wherein, in response to the selection, the display interface further causes the display of a first state change, from the initial state, with regard to the selected at least one first visual element, and second visual elements associated with the selected at least one first visual element, and a second state change, from the initial state, with regard to visual elements vertically adjacent to the selected at least one first visual element and second visual elements associated with the first visual elements vertically adjacent to the selected at least one first visual element such that the first state change and second state change is displayed as expanded on the user interface, both vertically and horizontally, a horizontal segment that is scrolled vertically over the display, the horizontal segment comprising the selected at least one first visual element, the visual elements vertically adjacent to the selected at least one first visual element and the associated second visual elements and a user can read information identifying the source displayed in the selected at least one first visual element and the visual elements vertically adjacent to the selected at least one first visual element, and read information identifying the specific program for the second visual elements associated with the selected at least one first visual element and the second visual elements associated with the first visual elements vertically adjacent to the selected at least one first visual element, wherein, responsive to selection, display interface further causing the display of the content for the second state change in a smaller format than the first state change, and the display interface further causing the display of first visual elements other than the selected at least one first visual element and the first visual elements vertically adjacent to the selected at least one first visual element, and second visual elements other than the second visual elements associated with the selected at least one first visual element and the second visual elements associated with the first visual elements vertically adjacent to the selected at least one first visual element to be maintained in the initial state such that no content identifying the source in the first visual elements and the specific program in the second visual elements is displayed and the number of second visual elements and first visual elements displayed is maximized.

53. The system as in claim 52 where the second visual elements are arranged in vertical columns which correspond to different time periods.

54. The system as in claim 53 wherein the vertical columns of second visual elements scroll horizontally in response to a second input from the input device.

55. The system as in claim 52 wherein the selectable source corresponds to a video channel.

56. A system comprising:
a display interface that causes the display of a number of visual elements in an initial state in a two dimensional array on on an interactive graphic user interface, each of the number of visual elements having a specific content associated with the visual element; and
an input device that sequentially selects at least one first visual element from the number of visual elements in response to an input from a user;
wherein in response to the selection, the display interface further causes the display of a first state change, from the initial state, associated with the selected at least one first visual element, the selected at least one first visual element being displayed proximate to its location in the two dimensional array such that the first state change expands on the user interface, vertically and horizontally and display of a second state change, from the initial state, with regard to visual elements vertically adjacent to the selected at least one first visual element, the display interface causing the visual elements vertically adjacent to the selected at least one first visual element to be displayed proximate to their location in the two dimensional array such that second state change expands on the user interface, vertically and horizontally and a user can read information identifying the specific content for the selected at least one first visual element displayed as part of first state change and information identifying the specific content for the visual elements vertically adjacent to the selected at least one visual element displayed as part of the second state change, the second state change displaying content in the visual elements vertically adjacent to the selected at least one first visual element in a smaller format than the first state change, and the display interface causing the display of first visual elements other than the selected at least one first visual element and visual elements vertically adjacent to the selected at least one first visual element to be maintained in the initial state such that no information identifying the specific content in the first visual element is displayed and the number of visual elements displayed is maximized.

57. A system comprising:
a display interface that causes the display of a number of first visual elements in an initial state in a vertical array on on an interactive graphic user interface, each first visual element corresponding to a selectable source and a number of second visual elements in the initial state on the user interface, a number of the second visual elements being associated with and horizontally disposed from each of the first visual elements, each second visual element corresponding to a specific program, the appearance of the number of second visual elements and the number of first visual elements being similar in appearance and of a first size such that no content is displayed in the second visual elements and first visual elements in order to maximize the number of second visual elements and first visual elements on the user interface in the initial state, the content including at least one of text, labels, advertisements, media, graphics, animation, and additional information; and
an input device that sequentially selects at least one first visual elements along the y-axis in response to an input from the user;
wherein, in response to the selection, the display interface further causes the display of a first state change, from the initial state, associated with the selected at least one first visual element and with the associated second visual elements, the display interface the selected elements to be displayed proximate to their location such that the the first state change expands a horizontal segment on the user interface, consisting of the selected at least one first visual elements and the associated second visual elements, that is scrolled vertically over the display and a user can read information identifying the source displayed in the selected at least one first visual element and information identifying content displayed in the second visual elements associated with the selected at least one first visual element, the expanded horizontal segment extending horizontally beyond the horizontal limits of unexpanded segments, and the display interface further causing the display of first visual elements other than the selected at least one first visual elements and second visual elements associated with the first visual elements other than the selected at least one first visual elements to be maintained in the initial state such that no content identifying the source in the first visual elements and the specific program in the second visual elements is displayed and the number of second visual elements and first visual elements displayed is maximized.

58. The system as in claim 57, wherein the display interface causes the displays of a second state change with respect to visual elements adjacent to the selected at least one first visual elements and the associated second elements, the display interface causing the display of information identifying the source displayed in the first visual elements adjacent to the selected at least one first visual element and identifying the specific program displayed in the second visual elements associated with the first visual elements adjacent to the selected at least one first visual element, the content being displayed in a smaller format than the first state change.

59. The system as in claim 58, wherein the display interface causes the display of a horizontal scrolling of the columns of second visual elements in response to a second input from the input device.

60. The system as in claim 59, wherein the input device is constrained to be responsive to only sequentially selecting vertically or to the horizontally scrolling at any one time.

61. The system as in claim 60, wherein either the sequential selecting or the horizontal scrolling is selected in response to a designated motion of the input device in a x axis or y axis direction.

62. A system comprising:
a display interface that causes the display of a number of visual elements in an initial state in a two dimensional array on an interactive graphic user interface, each of the number of visual elements having a specific content associated with the visual element; and
an input device that sequentially selects at least one visual elements in response to an input from a user;
wherein, in response to the selection, the display interface further causes the display of a first state change, from the initial state, with respect to the selected at least one visual elements and a second state change, from the initial state, with respect to visual elements adjacent to the selected at least one visual element, the display interface causing the selected at least one visual element and visual elements adjacent to the selected at least one first visual element to be displayed in the first state change and the second state change such that a user can read information identifying the specific content displayed in the selected at least one visual element and the visual elements adjacent to the selected at least one visual element, the second state change content displayed in a smaller format than the first state change, wherein the selected at least one visual element and the visual elements adjacent to the selected at least one visual elements are displayed in a fixed position and remaining elements of the user interface are displayed as scrolling vertically behind the fixed position, and the display interface further causes the display of first visual elements other than the selected at least one first visual element and visual elements adjacent to the selected at least one visual element to be maintained in the initial state such that no information identifying the specific content in the first visual element is displayed and the number of visual elements displayed is maximized.

63. A system comprising:
a display interface that causes the display of a number of visual elements in an initial state in a two dimensional array on an interactive graphic user interface, each of the number of visual elements having a specific content associated with the visual element; and
an input device that sequentially selects at least one visual elements in response to an input from a user;
wherein, in response to the selection, the display interface further causes the display of a first state change, from the initial state, with respect to the selected at least one visual element and a second state change, from the initial state, with respect to visual elements adjacent to the selected at least one visual element, the display interface causing the selected at least one visual element and the visual elements adjacent to the selected at least one visual element to be displayed proximate to their location such that the first state change and the second state change expand a viewing area on the user interface, consisting of the selected at least one visual element and the associated second visual elements, that is scrolled over the display and a user can read the information identifying content displayed in the selected at least one visual elements and information identifying content displayed in the visual elements adjacent to the selected at least one visual elements, the second state change content displayed in a smaller format than the first state change, wherein the expanded horizontal segment extends horizontally beyond the horizontal limits of unexpanded segments in the viewing area, and the display interface further causes the display of visual elements other than the selected at least one visual element and visual elements adjacent to the selected at least one visual element to be maintained in the initial state such that no information identifying the specific content in the visual elements is displayed and the number of visual elements displayed is maximized.

* * * * *